June 21, 1955  D. M. DANIEL  2,711,196
TILTING ARBOR BAND SAW
Filed June 1, 1953  3 Sheets-Sheet 1

INVENTOR.
DAVID M. DANIEL
BY
ATTORNEY

June 21, 1955  D. M. DANIEL  2,711,196
TILTING ARBOR BAND SAW
Filed June 1, 1953  3 Sheets-Sheet 2

INVENTOR.
DAVID M. DANIEL
BY
ATTORNEY

June 21, 1955 D. M. DANIEL 2,711,196
TILTING ARBOR BAND SAW
Filed June 1, 1953 3 Sheets-Sheet 3
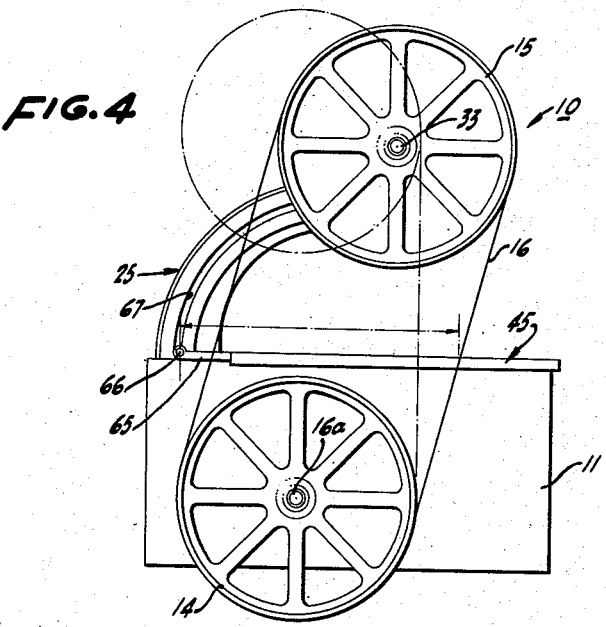
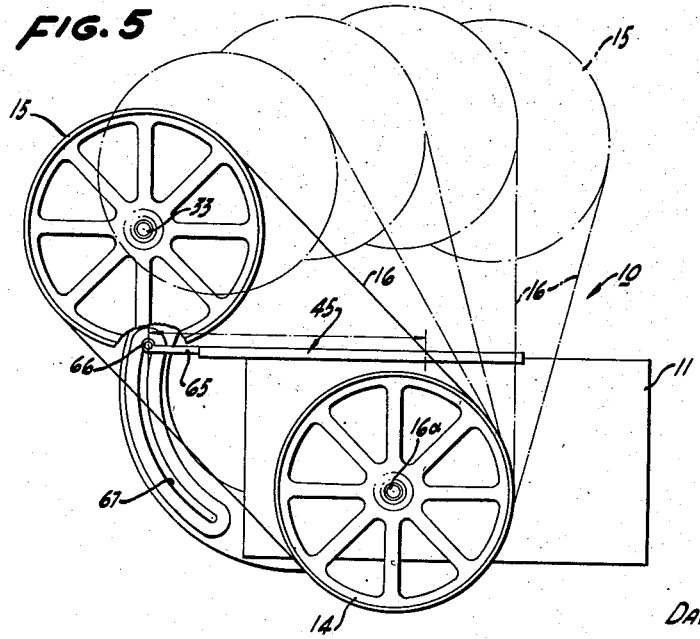
INVENTOR.
DAVID M. DANIEL
BY
ATTORNEY

United States Patent Office 2,711,196
Patented June 21, 1955

2,711,196
TILTING ARBOR BAND SAW
David M. Daniel, Berkeley, Calif.

Application June 1, 1953, Serial No. 358,903

2 Claims. (Cl. 143—24)

This invention relates to a tilting arbor band saw.

In tilting arbor band saws it is necessary to shift the work table horizontally to maintain the saw guide in registry with the band saw. The means employed for this purpose heretofore has been complex. Thus in some saws a complex gearing has been employed for this purpose.

It is an object of the present invention to provide a means of shifting the work table of a tilting arbor band saw in synchronism with the tilting of the arbor, such means being simpler than the means employed heretofore.

Another object is to provide a simple mechanical connection between the arbor and work table of a tilting arbor band saw which will shift the table in a horizontal plane to maintain the saw guide at all times in registry with the band saw.

These and other objects of the invention will be apparent from the ensuing description and the appended claims.

One form of the invention is illustrated by way of example in the accompanying drawings, in which, Figure 1 is a view in side elevation of the saw of the invention.

Figure 4 is a schematic view in side elevation of the saw of the present invention with the band saw in its extreme forward position.

Figure 5 is a view similar to that of Figure 4 but showing the saw in its extreme rearward position and also showing intermediate positions of the saw and of the work table.

Figure 1:
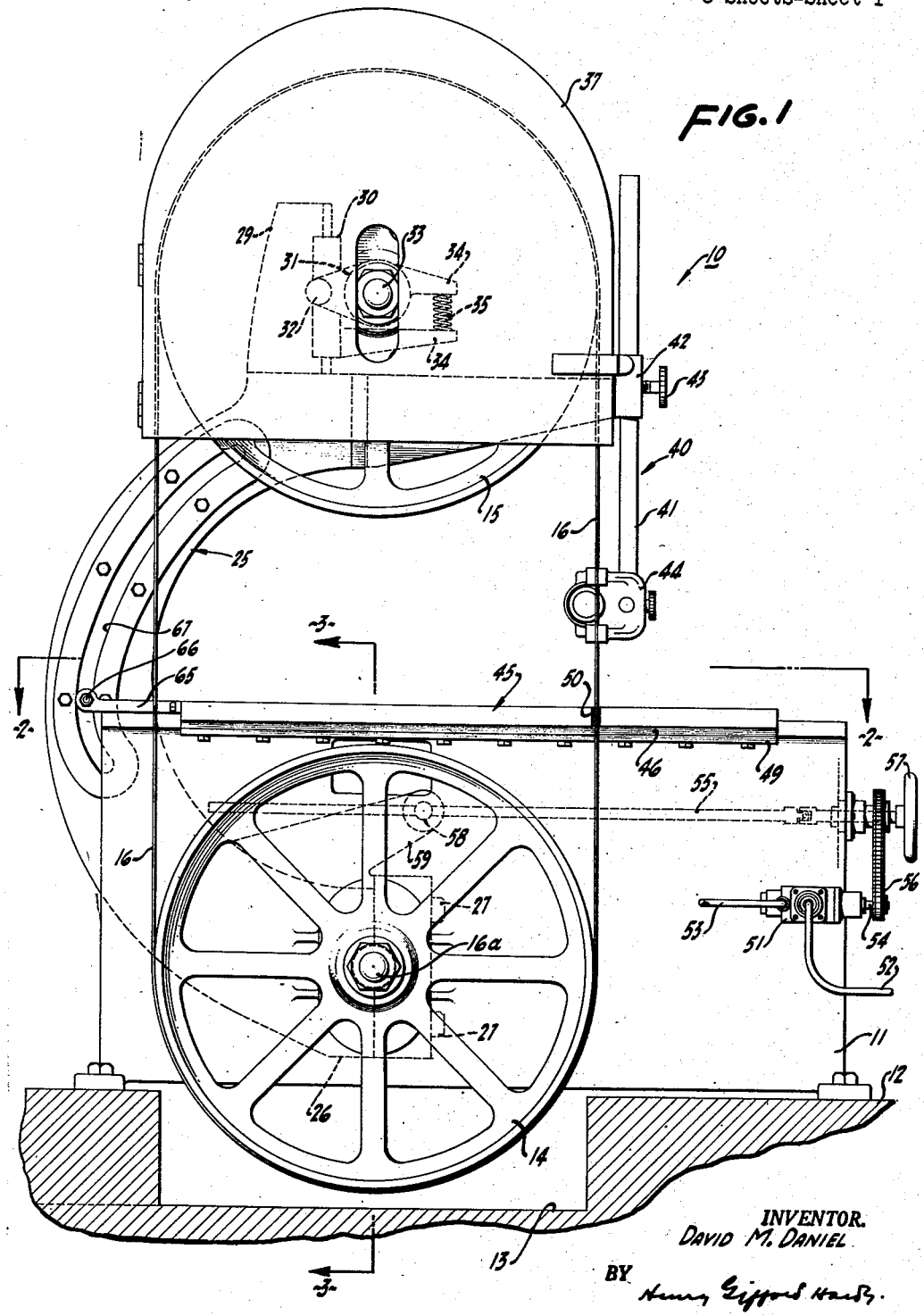

Referring now to the drawings and more particularly to Figure 1, the machine is generally designated by the numeral 10 and it comprises a frame 11 which is bolted to a floor 12 which is provided with a pit 13 to receive the lower band wheel 14 of the machine. The machine also comprises an upper band wheel 15 and a band saw 16 which is led about the band wheels 14 and 15.

The lower wheel 14 is fixed to one end of a shaft 16a which is journaled in bearings 17. To the other end of the shaft 16a is fixed a pulley 18 which is driven by a belt 19. The belt 19 in turn is driven by any suitable means (not shown). See Figure 3.

Figure 3:
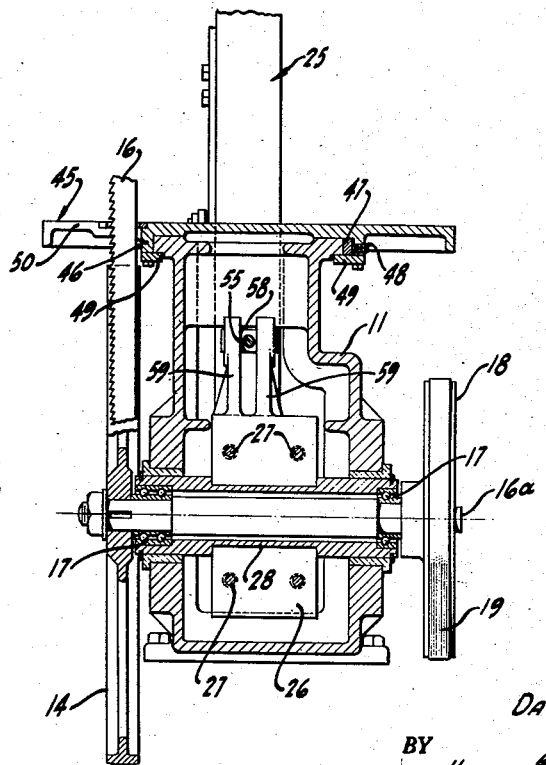
Figure 3 is a section taken along the line 3—3 of Figure 1 showing the mounting and the drive for the lower wheel of the saw and also showing the mounting of the work table.

The upper band wheel 15 is carried by a gooseneck 25 having at its lower end a hub 26 which is clamped by means of cap screws 27 to a sleeve 28 which is rotatable on the bearings 17 (see Figure 3).

At its upper end the gooseneck 25 is fixed to a column 29 on which a slide member 30 is slidable and is clamped in position by any suitable means (not shown). An upper bearing housing 31 is provided which is pivotally mounted at 32 on the slide member 30 and in which is journaled a shaft 33 which carries the upper band wheel 15. Fixed to the slide member 30 is a bracket 34, and an expansion spring 35 is compressed between the bracket 34 and a tongue 36 which is fixed to and extends outwardly from the upper bearing housing 31. The spring 35 serves the purpose of maintaining at all times an adequate tension on the band saw 16. It will be apparent that by adjustment of the slide member 30 upwardly or downwardly, a proper tension can be maintained on the band saw 16. A housing or guard 37 is provided for the upper band wheel 15.

An upper band guide 40 is provided having a rod 41 which is slidable in the outer end of a bracket 42 which is fixed to and extends outwardly from the gooseneck 25. The rod 41 is clamped in the desired position by means of a screw 43. A slotted guide 44 is provided at the lower end of the rod 41 through which the band 16 passes.

A table 45 is provided for the work piece and, as best shown in Figure 3, this table has downwardly extending flanges or guides 46 which are slidable on the frame 11. A wear plate is provided at 47 which is clamped by set screws such as the one shown at 48 in Figure 3. Gibs 49 are bolted to the guides 46. It will be apparent that the work table 45 is slidable horizontally. The work table is formed with a slot 50 through which the band saw 16 passes, thus providing the lower band guide for the saw.

The gooseneck 25 is rotated on the shaft 16a, in order to tilt the saw, by means which include an air motor 51 which is fixed to the frame 11 and which has an inlet 52 for compressed air and an operating lever 53. The shaft 54 of the motor 51 is rotated in one direction when the lever 53 is moved upwardly from the horizontal, neutral position shown in Figure 1 and it is rotated in the opposite direction when the operating lever 53 is moved downwardly. A shaft 55 is provided which is suitably journaled in the frame of the machine and is driven by the motor 51 through the medium of sprockets (not shown) on shafts 54 and 55 and a chain 56 meshing with the sprockets. The shaft 55 is also provided with a hand wheel 57 for manual operation of the shaft when desired. The shaft 55 is in threaded engagement with a nut 58 which is journaled between two ears 59 which are fixed to and extend from the gooseneck 25.

It will be apparent that, when operation of the air motor 51 is initiated, the threaded shaft 55 will be rotated. Such rotation will, by reason of the threaded engagement of the shaft 55 and bracket 58, rock or pivot the gooseneck 25 in either clockwise direction or counterclockwise direction depending upon the position of the operating lever 53.

As noted above, the work table 45 is slidable in a horizontal plane. The purpose of such sliding movement is to maintain the slot 50 in the table at all times in alignment with the band 16 regardless of the degree of tilt of the band, e. g., whether the band is in the vertical position shown in Figure 1, in the extreme forward position shown in Figure 4, in the extreme rearward position shown in Figure 5 or in any of the intermediate positions indicated in Figure 5.

Figure 2:
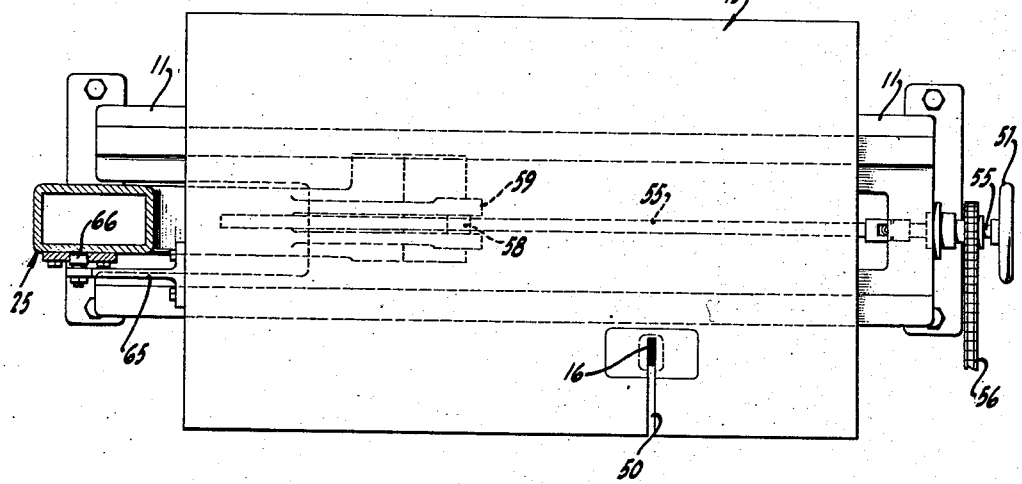
Figure 2 is a section taken along the line 2—2 of Figure 1 showing the work table in top plan view.

In order to accomplish such movement of the table 45 in synchronism with the tilting of the saw, an arm or extension 65 is provided which is fixed to the work table 45 and which, at its outer or left-hand end as viewed in Figures 1 and 2, has a cam follower roller 66 which rides in an arcuate cam slot 67 formed in the gooseneck 25. It will be observed that the cam slot 67 is not a circular arc. Its configuration is such that it will impart to the roller 66, hence to the work table 55, a linear movement which is the same as the horizontal component of the pivotal movement of the band 16 at the point where the band intersects the plane of the feed table 45.

It will therefore be apparent that a tilting arbor band saw has been provided wherein the pivoting or tilting of the arbor and the band is synchronized with horizontal shifting of the work table. The means employed to accomplish this is simple in construction and operation and is thoroughly and completely dependable.

I claim:

1. A tilting arbor band saw comprising a base, a work table slidable on the base in a horizontal plane, upper and lower band wheels each having a shaft serving as an axle, a C member connecting the upper and lower band wheels and supporting the shaft of the upper band wheel, said C member being mounted for pivotal movement about the axle drive shaft of the lower band wheel, a band saw extending about said wheels and driven thereby, said work table being formed with a saw guide for said band saw, screw means for pivoting said C member both clockwise and counterclockwise from the vertical and means operatively and directly connecting said work table and said C member whereby the horizontal component of tilting movement of the band saw at its point of intersection with the plane of the work table is directly imparted to said work table, said means comprising a cam formed on said C member and a cam follower carried by said work table and guided by said cam.

2. A tilting arbor band saw comprising a frame, a work table slidable on said frame in a horizontal plane, upper and lower band wheels, said lower band wheel being journaled in said frame, a band saw extending about said wheels and driven thereby, saw guide means on said work table for said band saw, a gooseneck pivotally mounted at its lower end for rotation about the axis of the lower band wheel and rotatably mounting the upper band wheel at its upper end, a cam formed on said gooseneck and a cam follower carried by said work table and guided by said cam, said cam having a configuration such as to impart to the cam follower and work table a horizontal movement which is identical to the horizontal component of tilting movement of the band saw at its point of intersection with the plane of the work table.

References Cited in the file of this patent

UNITED STATES PATENTS

| | | |
|---|---|---|
| 113,926 | Pryibil | Apr. 18, 1871 |
| 798,519 | Manning | Aug. 29, 1905 |
| 814,652 | Harrold et al. | Mar. 6, 1906 |